United States Patent [19]

Marshall

[11] Patent Number: 4,937,742

[45] Date of Patent: Jun. 26, 1990

[54] AUTOMATED SYSTEM FOR STATISTICALLY ANALYZING DATA CHARACTERISTICS OF SHIPMENTS OF COUPONS TO IDENTIFY INSTANCES OF COUPON SHIPMENT PARAMETRIC ABNORMALITIES

[75] Inventor: Robert Marshall, El Paso, Tex.

[73] Assignee: A. C. Nielsen Company, Northbrook, Ill.

[21] Appl. No.: 849,431

[22] Filed: Apr. 8, 1986

[51] Int. Cl.$^5$ .................. G06F 15/21; G06F 7/20; G06F 7/24

[52] U.S. Cl. .................................................. 364/401

[58] Field of Search ............... 364/401, 200 MS File, 364/900 MS File

[56] References Cited

U.S. PATENT DOCUMENTS

| | | | |
|---|---|---|---|
| 4,382,277 | 5/1983 | Glaser et al. | 364/200 |
| 4,554,446 | 11/1985 | Murphy et al. | 235/487 |
| 4,595,982 | 6/1986 | Burt | 364/300 |
| 4,648,044 | 3/1987 | Hardy et al. | 364/900 X |

FOREIGN PATENT DOCUMENTS

85/01373 3/1985 PCT Int'l Appl. .
86/03310 6/1985 PCT Int'l Appl. .

OTHER PUBLICATIONS

Baker, B. "Psychological profile: Probing Killer's Mind", *Los Angeles Times*, Metro Section, Aug. 29, 1985, p. 1, part 2, column 1.

U.S. Congress, Office of Technology Assessment, *Federal Government Information Technology: Electronic Record Systems and Individual Privacy*, OTA-CIT-296 (Washington, D.C. U.S. Government Printing Office, Jun. 1986), 86–95.

*Primary Examiner*—Clark A. Jablon
*Attorney, Agent, or Firm*—Mason, Kolehmainen, Rathburn & Wyss

[57] ABSTRACT

A manufacturer's discount coupon redemption system and method provide for the automated statistical analysis of coupon shipment data characteristics in order to identify coupon shipment parametric abnormalities. Allowable ranges for preselected coupon shipment data characteristics are established and are automatically updated. Data characteristics associated with each coupon shipment are compared to the allowable ranges to identify instances of coupon shipment parametric abnormalities, that is, data characteristics that fall outside of the allowable ranges. Those coupon shipments that exhibit parametric abnormalities are segregated for further review and evaluation. The system and method utilize an operational knowledge base in which data characteristics of interest associated with a plurality of previously processed coupon shipments from a plurality of retail stores are stored and used as an information base to statistically derive the allowable ranges against which the data characteristics of new coupon shipments are compared. Periodically, at least a portion of the information stored in the operational knowledge base is replaced with data characteristics associated with more recently processed coupon shipments. Ultimately, the system and method result in a decision either to pay the submitting retail stores for their coupon shipments or to deny payment or to refer the payment decision to the involved manufacturers. In addition, the information identified and utilized in the system and method may be used to provide extensive financial and marketing information services.

43 Claims, 10 Drawing Sheets

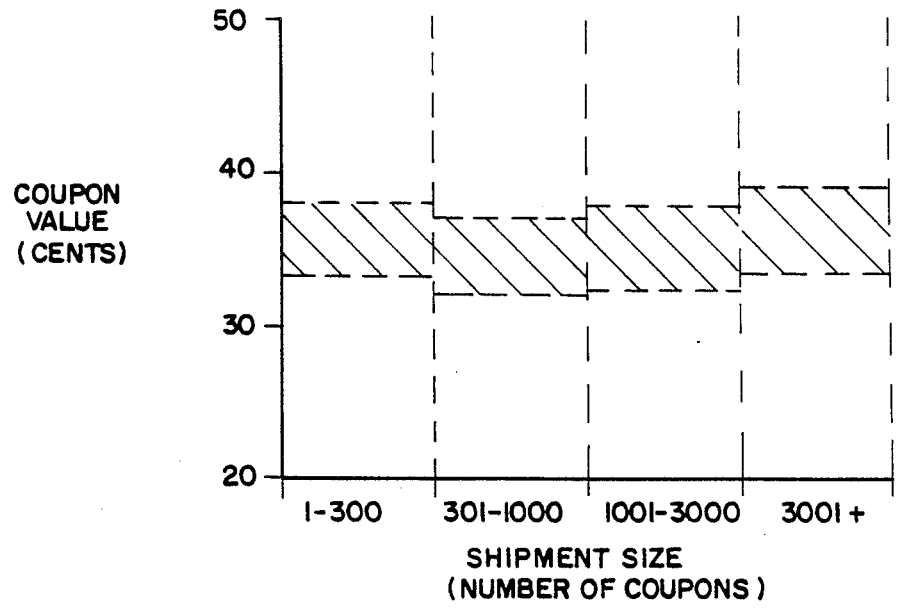
FIG-4-
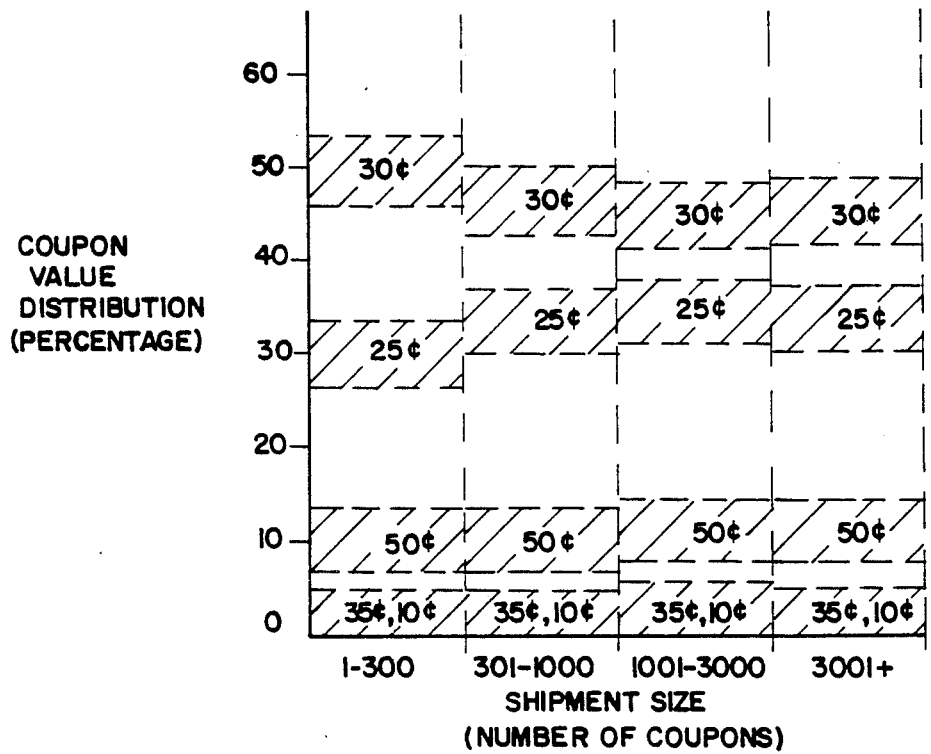
FIG-5-

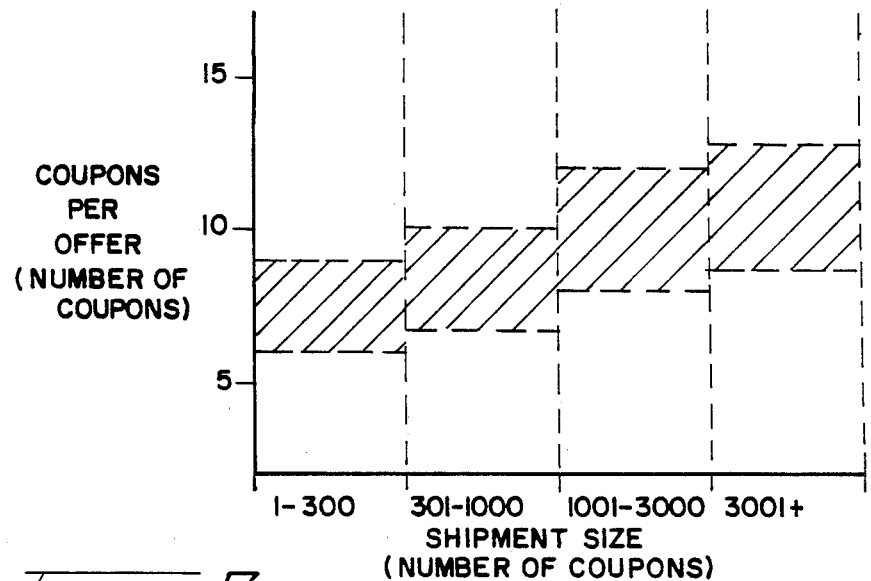
FIG-6-
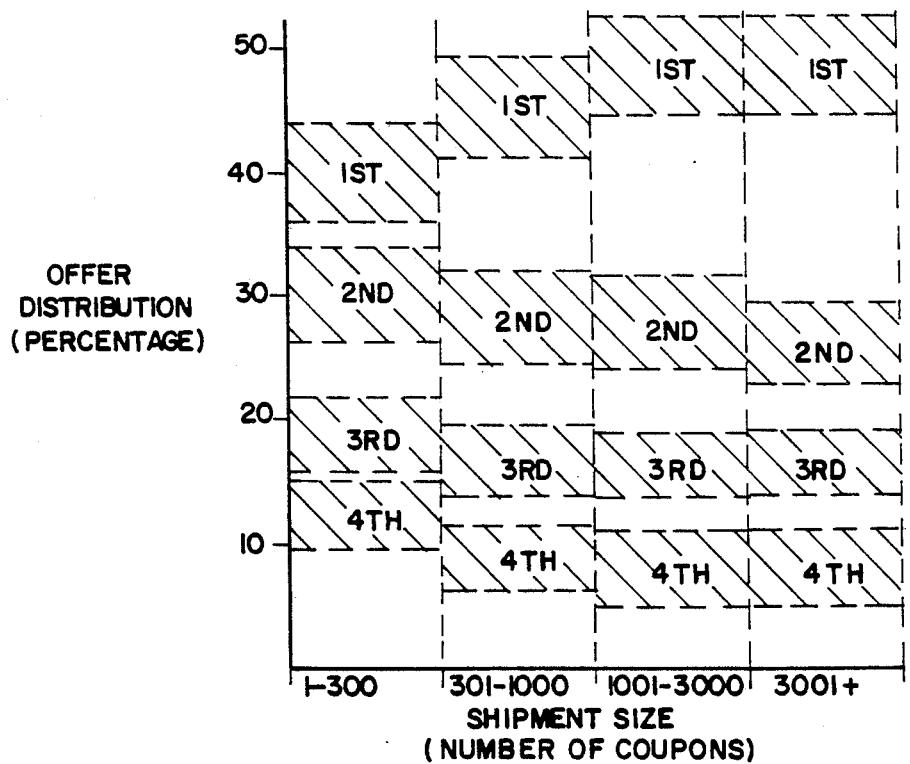
FIG-7-

FIG-9

SHIPMENT

| Coupon Value | $.10 | $.12 | $.15 | $.20 | $.25 | $.30 | $.35 | $.40 | $.45 | $.50 | $.60 | $.70 | $.75 | $1.00 | $1.25 | $1.50 | $1.75 | $2.00 | $3.00 | $5.00 | AVE. COUPON VALUE (CENTS) | AVE. NUMBER OF COUPONS PER OFFER |
|---|---|---|---|---|---|---|---|---|---|---|---|---|---|---|---|---|---|---|---|---|---|---|
| 1 | 0.13 | 0.07 | 0.53 | 0.00 | 0.07 | 0.20 | 0.00 | 0.00 | 0.00 | 0.00 | 0.00 | 0.00 | 0.00 | 0.00 | 0.00 | 0.00 | 0.00 | 0.00 | 0.00 | 0.00 | 17.80 | 1.36 |
| 2 | 0.13 | 0.05 | 0.32 | 0.25 | 0.10 | 0.03 | 0.02 | 0.02 | 0.00 | 0.00 | 0.00 | 0.00 | 0.05 | 0.00 | 0.00 | 0.00 | 0.00 | 0.00 | 0.00 | 0.02 | 22.07 | 1.33 |
| 3 | 0.00 | 0.00 | 0.52 | 0.48 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 17.39 | 22.00 |
| 4 | 0.00 | 0.00 | 0.51 | 0.49 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 17.47 | 42.50 |
| 5 | 0.17 | 0.03 | 0.32 | 0.12 | 0.24 | 0.04 | 0.05 | 0.00 | 0.00 | 0.01 | 0.00 | 0.00 | 0.00 | 0.00 | 0.00 | 0.00 | 0.00 | 0.00 | 0.00 | 0.00 | 19.32 | 2.17 |
| 6 | 0.14 | 0.02 | 0.28 | 0.20 | 0.17 | 0.10 | 0.09 | 0.00 | 0.00 | 0.00 | 0.00 | 0.00 | 0.00 | 0.00 | 0.00 | 0.00 | 0.00 | 0.00 | 0.00 | 0.00 | 20.33 | 3.46 |
| 7 | 0.07 | 0.00 | 0.30 | 0.23 | 0.27 | 0.05 | 0.05 | 0.00 | 0.00 | 0.00 | 0.00 | 0.00 | 0.00 | 0.00 | 0.00 | 0.00 | 0.00 | 0.00 | 0.00 | 0.00 | 29.54 | 2.64 |
| 8 | 0.16 | 0.05 | 0.42 | 0.21 | 0.16 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 16.68 | 1.19 |
| 9 | 0.05 | 0.04 | 0.27 | 0.20 | 0.25 | 0.04 | 0.16 | 0.00 | 0.00 | 0.00 | 0.00 | 0.00 | 0.00 | 0.00 | 0.00 | 0.00 | 0.00 | 0.00 | 0.00 | 0.00 | 21.86 | 1.56 |
| 10 | 0.28 | 0.00 | 0.37 | 0.26 | 0.09 | 0.00 | 0.00 | 0.00 | 0.00 | 0.00 | 0.00 | 0.00 | 0.00 | 0.00 | 0.00 | 0.04 | 0.00 | 0.00 | 0.00 | 0.00 | 15.85 | 9.29 |
| 11 | 0.00 | 0.00 | 0.60 | 0.12 | 0.20 | 0.00 | 0.04 | 0.00 | 0.00 | 0.00 | 0.00 | 0.00 | 0.01 | 0.01 | 0.00 | 0.00 | 0.00 | 0.00 | 0.00 | 0.00 | 24.16 | 1.19 |
| 12 | 0.11 | 0.03 | 0.39 | 0.06 | 0.21 | 0.02 | 0.09 | 0.01 | 0.00 | 0.01 | 0.00 | 0.00 | 0.00 | 0.00 | 0.01 | 0.00 | 0.00 | 0.01 | 0.00 | 0.01 | 20.82 | 2.69 |
| 13 | 0.28 | 0.05 | 0.48 | 0.03 | 0.10 | 0.01 | 0.02 | 0.00 | 0.00 | 0.00 | 0.00 | 0.00 | 0.02 | 0.02 | 0.00 | 0.00 | 0.00 | 0.00 | 0.00 | 0.00 | 16.27 | 1.92 |
| 14 | 0.14 | 0.01 | 0.24 | 0.19 | 0.21 | 0.04 | 0.09 | 0.00 | 0.00 | 0.03 | 0.00 | 0.00 | 0.00 | 0.00 | 0.00 | 0.00 | 0.00 | 0.01 | 0.00 | 0.01 | 24.14 | 2.76 |
| 15 | 0.00 | 0.00 | 0.38 | 0.02 | 0.35 | 0.00 | 0.19 | 0.00 | 0.00 | 0.03 | 0.00 | 0.00 | 0.02 | 0.00 | 0.00 | 0.00 | 0.00 | 0.01 | 0.00 | 0.08 | 24.85 | 5.91 |
| 16 | 0.08 | 0.00 | 0.42 | 0.17 | 0.17 | 0.04 | 0.04 | 0.00 | 0.00 | 0.00 | 0.00 | 0.00 | 0.00 | 0.00 | 0.00 | 0.00 | 0.00 | 0.09 | 0.00 | 0.00 | 25.54 | 1.33 |
| 17 | 0.14 | 0.06 | 0.42 | 0.11 | 0.25 | 0.00 | 0.03 | 0.00 | 0.00 | 0.03 | 0.00 | 0.00 | 0.00 | 0.00 | 0.00 | 0.00 | 0.00 | 0.00 | 0.00 | 0.00 | 17.75 | 1.44 |
| 18 | 0.11 | 0.06 | 0.29 | 0.11 | 0.20 | 0.00 | 0.06 | 0.03 | 0.00 | 0.00 | 0.00 | 0.00 | 0.05 | 0.01 | 0.00 | 0.11 | 0.00 | 0.00 | 0.00 | 0.00 | 34.54 | 1.46 |
| 19 | 0.09 | 0.00 | 0.23 | 0.23 | 0.14 | 0.05 | 0.09 | 0.05 | 0.00 | 0.03 | 0.00 | 0.00 | 0.00 | 0.00 | 0.00 | 0.00 | 0.00 | 0.09 | 0.00 | 0.00 | 38.09 | 1.29 |
| 20 | 0.07 | 0.00 | 0.53 | 0.00 | 0.27 | 0.07 | 0.00 | 0.00 | 0.00 | 0.00 | 0.00 | 0.00 | 0.00 | 0.01 | 0.00 | 0.00 | 0.00 | 0.00 | 0.00 | 0.00 | 18.00 | 1.07 |
| 21 | 0.15 | 0.00 | 0.40 | 0.14 | 0.21 | 0.04 | 0.05 | 0.00 | 0.00 | 0.00 | 0.00 | 0.00 | 0.00 | 0.00 | 0.00 | 0.10 | 0.00 | 0.00 | 0.00 | 0.00 | 19.82 | 1.90 |
| 22 | 0.15 | 0.04 | 0.23 | 0.15 | 0.35 | 0.00 | 0.08 | 0.10 | 0.00 | 0.00 | 0.00 | 0.00 | 0.00 | 0.01 | 0.00 | 0.00 | 0.00 | 0.00 | 0.00 | 0.00 | 19.88 | 1.44 |
| 23 | 0.10 | 0.00 | 0.25 | 0.10 | 0.35 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 33.40 | 1.25 |
| 24 | 0.00 | 0.00 | 0.70 | 0.11 | 0.15 | 0.00 | 0.00 | 0.00 | 0.00 | 0.02 | 0.00 | 0.00 | 0.00 | 0.02 | 0.00 | 0.00 | 0.00 | 0.00 | 0.00 | 0.04 | 21.26 | 1.29 |
| 25 | 0.07 | 0.00 | 0.29 | 0.12 | 0.19 | 0.07 | 0.10 | 0.12 | 0.00 | 0.02 | 0.00 | 0.00 | 0.00 | 0.02 | 0.00 | 0.00 | 0.00 | 0.00 | 0.00 | 0.00 | 25.95 | 1.35 |
| 26 | 0.16 | 0.02 | 0.31 | 0.16 | 0.20 | 0.11 | 0.04 | 0.00 | 0.00 | 0.00 | 0.00 | 0.00 | 0.00 | 0.00 | 0.00 | 0.00 | 0.00 | 0.00 | 0.00 | 0.00 | 19.49 | 1.00 |

PERCENTAGE OF SHIPMENT IN EACH COUPON VALUE CATEGORY

FIG. 10

| PARAMETER ($x_i$) | AVERAGE | STANDARD DEVIATION ($\sigma$) | ALLOWABLE RANGE ($\pm 2\sigma$) |
|---|---|---|---|
| Coupon Value | 22.83 | 6.48 | 9.87-35.79 |
| Coupons/Offer | 3.23 | 5.09 | 0-13.40 |
| Value Content | | | ($\pm 3\sigma$) |
| $ .10 | 0.089 | 0.072 | 0-0.305 |
| $ .12 | 0.026 | 0.046 | 0-0.157 |
| $ .15 | 0.341 | 0.159 | 0-0.820 |
| $ .20 | 0.167 | 0.135 | 0-0.572 |
| $ .25 | 0.221 | 0.158 | 0-0.695 |
| $ .30 | 0.044 | 0.070 | 0-0.253 |
| $ .35 | 0.069 | 0.097 | 0-0.361 |

FIG. 11

RETAIL STORE NAME 4372851          XYZ CORPORATION 12121

| NUMBER OF COUPONS | COUPON VALUE | OFFER CODE |
|---|---|---|
| 24 | $ .75 | 606620 |
| 9 | $ .50 | 343434 |
| 9 | $ .12 | 607677 |

| TOTAL COUPONS | TOTAL COUPON VALUE |
|---|---|
| 42 | $23.58 |

---

FIRST ALERT:     Coupon Value     $0.56

KEY ALERT:       TOO MANY $ .75 COUPONS

|  | Ave. | SD | Range | This Store |
|---|---|---|---|---|
| Coupon Value | .23 | .06 | 0.10- 0.36 | 0.56 ALERT |
| Coupon Offer | 3.23 | 5.09 | 0.00-13.40 | 14.00 ALERT |

| Value | Ave. | SD | Range | This Store | Value | Ave. | SD | Range | This Store |
|---|---|---|---|---|---|---|---|---|---|
| 15 | .34 | .16 | .00-.82 | 0.00 | 75 | .00 | .02 | .00-.06 | 0.57 ALERT |
| 25 | .22 | .16 | .00-.69 | 0.00 | 100 | .00 | .01 | .00-.04 | 0.00 |
| 20 | .17 | .14 | .00-.57 | 0.00 | 45 | .00 | .02 | .00-.06 | 0.00 |
| 10 | .09 | .07 | .00-.31 | 0.00 | 150 | .00 | .01 | .00-.04 | 0.00 |
| 35 | .07 | .10 | .00-.36 | 0.00 | 125 | .00 | .01 | .00-.03 | 0.00 |
| 30 | .04 | .07 | .00-.25 | 0.00 | 200 | .00 | .01 | .00-.02 | 0.00 |
| 12 | .02 | .05 | .00-.16 | 0.21 ALERT | 70 | .00 | .00 | .00-.01 | 0.00 |
| 500 | .02 | .06 | .00-.18 | 0.00 | 300 | .00 | .00 | .00-.01 | 0.00 |
| 50 | .01 | .03 | .00-.11 | 0.21 ALERT | 175 | .00 | .00 | .00-.00 | 0.00 |
| 40 | .01 | .02 | .00-.06 | 0.00 | 60 | .00 | .00 | .00-.00 | 0.00 |

ABNORMALITY AUDIT REVIEW

Store Information

No Store? _____     Suspense? _____     Referral? _____     Parametric Abnormality History? _____

Coupon Appearance

Mint? _____     Gang Cut? _____     Treated? _____     Other? _____

Auditor's Comments

-------------------------------------------------------------------------
-------------------------------------------------------------------------

DECISION:        Pay? _____        Deny? _____        Refer? _____

AUTOMATED SYSTEM FOR STATISTICALLY ANALYZING DATA CHARACTERISTICS OF SHIPMENTS OF COUPONS TO IDENTIFY INSTANCES OF COUPON SHIPMENT PARAMETRIC ABNORMALITIES

BACKGROUND OF THE INVENTION

A. Field of the Invention

The present invention generally relates to systems and methods for processing price discount coupons issued by manufacturers and, more particularly, to a system and method for automatically identifying coupon shipment irregularities.

B. Description of the Prior Art

The issuance of price discount coupons by manufacturers in the United States and throughout the world continues to be a highly successful method for stimulating retail product sales. A typical manufacturer's discount coupon 15 (FIG. 1) issued by a specific manufacturer, for example, the XYZ Corporation, normally offers consumers the opportunity to buy a specific product of the manufacturer at a discount, for example, fifty cents less than the normal retail price for that product. Some discount coupons have a specified expiration date and others have no expiration date. The typical coupon 15 (FIG. 1) includes a manufacturer's identification code "12121" that identifies the manufacturer as the XYZ Corporation and an offer or promotion code "343434" that identifies a particular offer or promotion of the manufacturer. To facilitate coupon redemption, the manufacturer's identification code and the offer or promotion code are printed on many coupons in "OCR" characters that can be optically scanned and interpreted by an optical character recognition system. Alternatively, the manufacturer's code and the offer or promotion code can be printed on the coupon using conventional bar codes that can be optically scanned and interpreted using a bar code reader.

During the year 1985, more than 170 billion discount coupons were issued in the United States by manufacturers; and redemptions of those coupons approached 7 billion coupons. Since the face value and handling allowance for each coupon averaged approximately forty cents (U.S.) per coupon, coupon redemptions for 1985 amounted to almost 2.8 billion dollars (U.S.).

Discount coupons issued by manufacturers have value and are sometimes referred to as "pseudomoney". Predictably, some fraction of the coupon redemptions from retail stores are improper. Although the extent of coupon misredemption is not clearly ascertainable, the consensus in the industry is that it amounts to at least fifteen percent of the coupons redeemed. Assuming such a level of misredemption, losses in 1985 on an industry-wide basis due to coupon misredemption are estimated to be approximately 420 million dollars.

The reasons behind coupon misredemption range from the attempts of small retail stores to redeem a few extra coupons for which no retail purchases were made to large scale criminal activities. Recently, manufacturers as a whole have become more aggressive in handling "suspicious" coupon shipments as is evidenced by a higher level of coupon redemption payment denials. The denial of a coupon redemption payment, however, is a highly sensitive event because of the on-going trade relations between manufacturers and their customers, the retailers.

Systems and methods for determining instances of coupon misredemption have evolved and have been refined over the years. Today, for example, there are refined methods for authenticating the identity of retail stores and for interpreting the volumetrics of coupon redemption by retail stores, for example, by the closer monitoring and correlation of coupon redemption and retail product stocking levels. Such refinements have increased the level of confidence in the sensitive coupon misredemption payment decision.

However, by and large, the visual appearance of a shipment of coupons from a retail store and the judgment of coupon redemption processors still provide the major method of detecting instances of coupon misredemption. A typical prior art system 20 (FIG. 2) at a coupon redemption center for handling the redemption of coupons and for determining instances of coupon misredemption includes multiple stages. Initially, at an Incoming Coupon Shipment stage 22, normal warehousing functions are performed, such as the incoming inspection of coupon shipments from retail stores, the counting of the number of boxes of coupons in each shipment, the weighing of each shipment and the assignment of a job number or inventory control number to each shipment. Preferably, the coupons in the shipments are organized or grouped such that all of the coupons in the shipment for each particular manufacturer are grouped together. This enables all of the coupons shipped from a retail store and issued by, for example, the XYZ Corporation to be processed as a single shipment at a coupon redemption center. This function may be performed at the retail store prior to shipment or at a retailers coupon clearing house or at a manufacturer's coupon redemption center.

The next stage in a typical prior art system 20 includes a Transaction Preparation And Review stage 24 in which the authenticity of the submitting retail store is verified and the coupon shipment is organized for processing. In addition, the submitting retail store's name and address are checked against files of known coupon misredeemers; and visual checks of the coupons in the shipment are made to detect physical irregularities, such as coupons in mint condition or coupons that have been gang cut or coupons that have been treated, for example by washing or staining or intentional wrinkling, to impart the appearance of prior handling or age.

A coupon redemption payment decision normally is made at this stage 24. If the retail store's identity is not authentic or if the retailer has a history of misredemption or if there are substantial physical irregularities associated with a coupon shipment, payment for the shipment of coupons will be denied or a decision as to payment will be referred to the manufacturer. In some cases, particularly where there are substantial irregularities associated with a coupon shipment, a suspicious coupon shipment will be set aside for a separate special investigation. For example, the number of coupons in the suspicious coupon shipment from a specific retail store may be compared to the number of coupons in previously submitted coupon shipments from the same retail store in order to determine whether or not gross volumetric abnormalities are present. Also, if the coupons in a suspicious coupon shipment contain serially assigned coupon sequence numbers, those sequence numbers may be reviewed for irregular redemption patterns. Furthermore, the geographic distribution area of a specific coupon offer associated with one or more coupons in a suspicious coupon shipment may be compared with the geographic area of the submitting retail store to determine whether or not geographic abnormalities associated with the coupon shipment are present. Also, if the information is available, the retail product stocking levels of a retailer who has submitted a suspicious coupon shipment may be compared with the specific offer or offers in the coupon shipment to determine whether or not there is a correspondence between those product stocking levels and the coupons in the coupon shipment. This information may be helpful in making the coupon shipment payment, denial or referral decision Alternately, if the retail store's identity is authentic and if the retailer has no history of misredemption and if the coupons in the shipment do not exhibit substantial physical irregularities, the shipment progresses to a Paper Handling And Data Collection stage 26.

The operations performed at the Paper Handling And Data Collection stage 26 of a typical prior art coupon redemption system 20 depend upon the type and extent of services offered by the coupon redemption center to a particular manufacturer. For example, the functions at this stage 26 may include the individual entry into a computer of every coupon associated with a particular shipment of a specific manufacturer's coupons from a retail store. The data entered into the computer for each coupon typically would include the coupon value (for example, fifty cents in FIG. 1), the manufacturer's code (for example, "12121") and the offer or promotion code (for example, "343434"). If desired by a manufacturer, other data associated with the coupon of the submitting retail store (for example, the geographic location of the submitting retail store) may also be entered into the computer. The coupon information typically would be entered into the computer by standard keyboard entry or by an optical or laser scanner capable of reading either conventional bar codes or "OCR" strings, such as the manufacturer's code and the offer code, printed on a coupon. The coupons may also be sorted into various subgroups at this stage 26 corresponding to, for example, price and particular offers or promotions. The coupons normally are counted and totals for individual retail stores are normally entered into a computer. Samples from the coupon shipments may also be retained for shipment to the manufacturer.

All of the above functions at this stage 26 have the general objective of fulfilling the financial obligations relating to the submission of coupons by retail stores for redemption as generally indicated by the Financial Services stage 28 of the system 20. In addition, as generally indicated by the Marketing Statistical Services stage 30, statistical information relating to the coupons submitted by retail stores may be simultaneously collected by the system 20 for use in providing marketing information to manufacturers.

The above typical prior art coupon redemption system 20 certainly is adequate for certain manufacturers' purposes. However, there has been a heretofore unfulfilled need in the industry for a more sensitive and precise coupon redemption system capable of rapidly and accurately identifying instances of probable coupon misredemption, particularly when misredemption is not apparent from the physical appearance of the coupons being redeemed.

SUMMARY OF THE INVENTION

An object of the present invention is to provide a new and improved coupon redemption system and method.

Another object of the present invention is to provide a new and improved coupon redemption system and method capable of rapidly and accurately identifying instances of coupon misredemption.

Another object of the present invention is to provide a new and improved coupon redemption system and method capable of statistically analyzing coupon shipment data characteristics or parameters on an automated basis.

Another object of the present invention is to provide a new and improved system and method for identifying instances of coupon misredemption by statistically analyzing the data characteristics or parameters associated with a coupon shipment with corresponding data characteristics or parameters associated with previously submitted coupon shipments.

Briefly, the present invention constitutes a new and improved coupon redemption system and method that is capable of rapidly and accurately identifying instances of probable coupon misredemption. The stages of a typical prior art system 20 as discussed above are utilized in the system and method of the present invention. In addition, the system and method of the present invention provide for the automated statistical analysis of coupon shipment data characteristics or parameters in order to identify coupon shipment abnormalities that may not be apparent from the physical appearance of the coupons. The inventive system and method establish allowable ranges for preselected coupon shipment data characteristics or parameters and update those allowable ranges as changes occur with time. Data characteristics or parameters associated with each coupon shipment are compared to the allowable ranges to identify instances of coupon shipment parametric abnormalities, that is, data characteristics that fall outside of the allowable ranges. Those coupon shipments that exhibit parametric abnormalities are segregated for further review and evaluation. Preferably, they are subjected to a further intensive inspection and analysis with respect to their physical characteristics and with respect to the specific parametric abnormalities determined by the present invention. This further review and evaluation results in a decision to either pay the retail store for the shipment of coupons or to deny payment or, possibly, to refer the payment decision to the involved manufacturer. The information obtained from the system and method of the present invention is accumulated and used to provide normal coupon redemption financial services and marketing statistical services to manufacturers.

BRIEF DESCRIPTION OF THE DRAWING

The above and other objects and advantages and novel features of the present invention will become apparent from the following detailed description of the preferred embodiment of the present invention illustrated in the accompanying drawing wherein:

FIG. 4 is a graphical depiction of allowable ranges for an illustrative coupon shipment statistical parameter, namely the average coupon value in a coupon shipment, segregated by coupon shipment size;

FIG. 5 is a graphical depiction of allowable ranges for another illustrative coupon shipment statistical parameter, namely the coupon value distribution as a percentage of the coupon shipment, segregated by coupon shipment size;

FIG. 6 is a graphical depiction of allowable ranges for another illustrative coupon shipment statistical parameter, namely the average number of coupons per offer in a coupon shipment, segregated by coupon shipment size;

FIG. 7 is a graphical depiction of allowable ranges for another illustrative coupon shipment statistical parameter, namely the offer distribution of a coupon shipment, segregated by the shipment size;

FIG. 9 is a graphical depiction of illustrative coupon shipment statistical parameters associated with twenty-six coupon shipments that form a part of the operational knowledge base of the present invention, specifically depicting the percentage of each coupon shipment associated with each of twenty different coupon values, the average coupon value in each shipment and the average number of coupons per offer in each shipment;

FIG. 10 is a graphical depiction of illustrative parametrics established by the present invention for use in statistically analyzing coupon shipments;

FIG. 11 is illustrative output data from the present invention for use in conducting a coupon shipment abnormality audit review as part of the coupon shipment payment, denial or referral decision.

Figure 2:
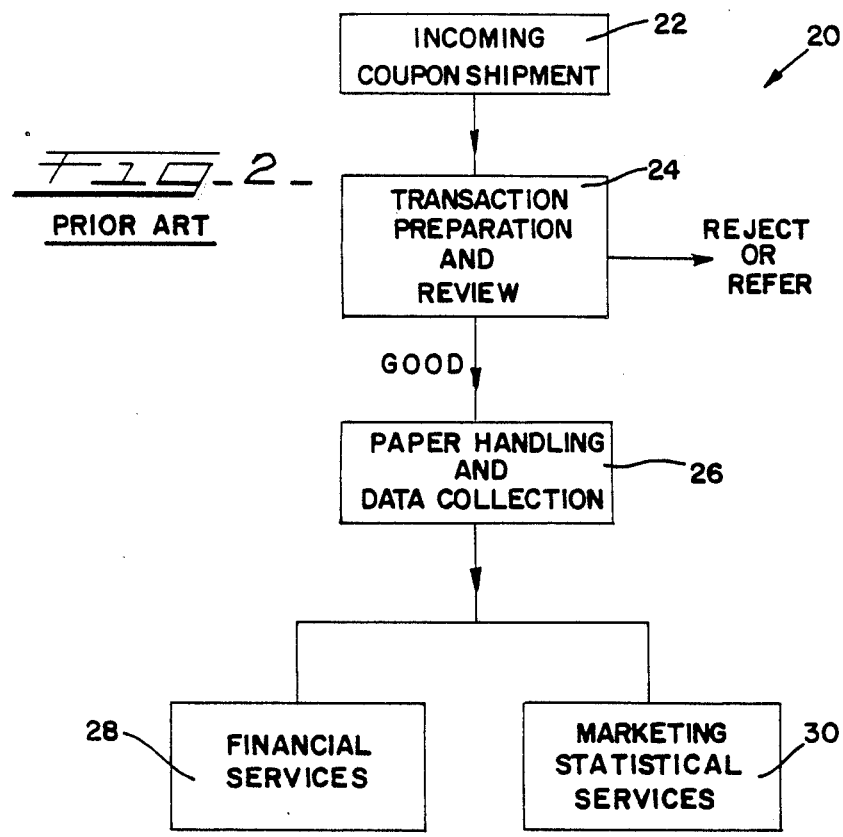
FIG. 2 is a block diagram showing the various stages in a typical prior art coupon redemption system.
Figure 3:
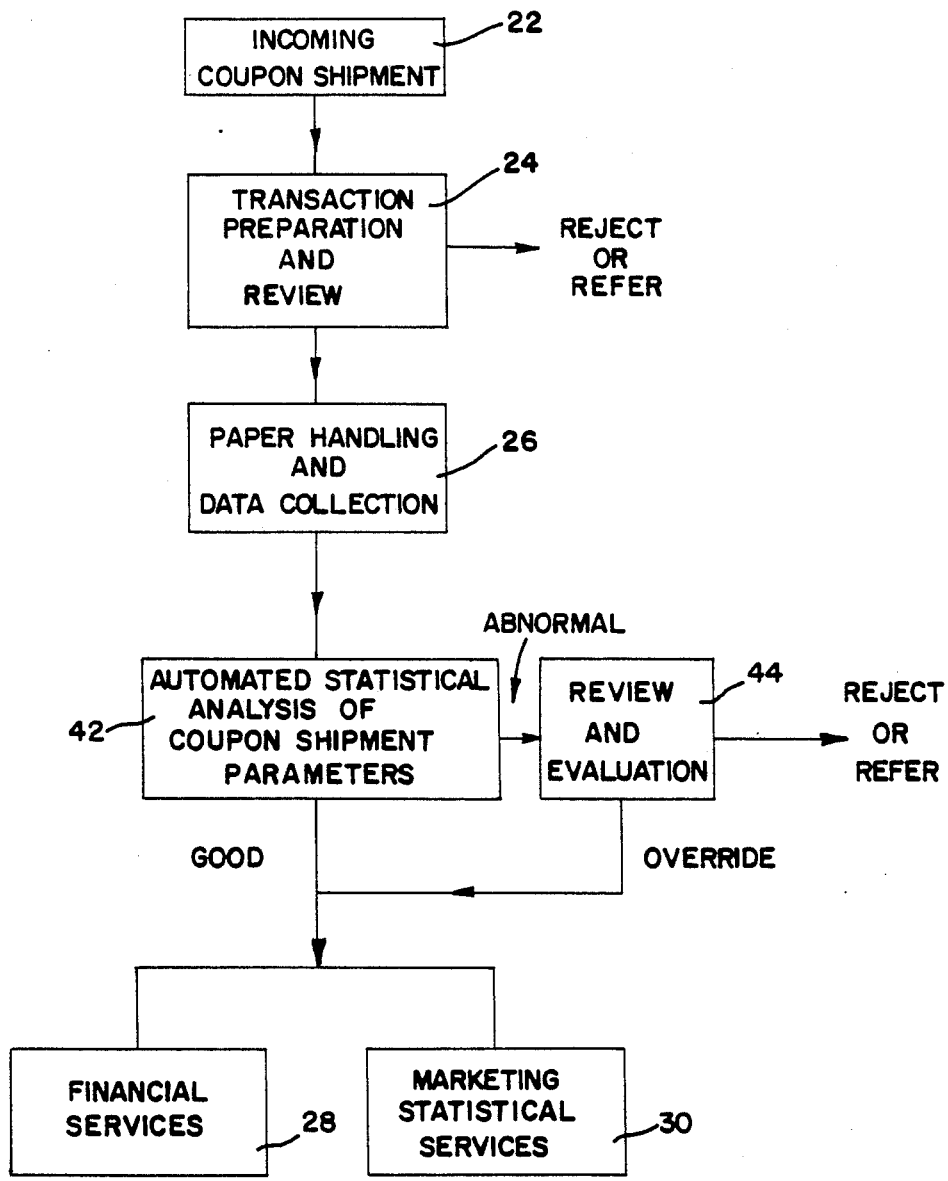
FIG. 3 is a block diagram showing the various stages in the preferred embodiment of a coupon redemption system and method constructed in accordance with the principles of the present invention.

Referring initially to FIG. 3 of the drawing, there is illustrated a new and improved coupon redemption system 40 and method constructed in accordance with the principles of the present invention. The system 40 includes the conventional stages 22, 24 and 26 and, ultimately, the conventional output stages 28 and 30 discussed hereinabove with reference to FIG. 2. The system 40, however, also includes an Automated Statistical Analysis Of Coupon Shipment Parameters stage 42 followed by, in the case of the detection of coupon shipment abnormalities, an additional Review And Evaluation stage 44.

The statistical analysis stage 42 utilizes certain previously identified and selected data characteristics or parameters, considered to be representative of coupon shipments in general, in statistically analyzing on an automated basis the parameters of a coupon shipment. There are certain data characteristics or parameters that are generally representative of most legitimate coupon redemption shipments. These parameters include the average coupon value in a coupon shipment, the coupon value distribution within a coupon shipment, the average number of coupons per offer in a coupon shipment and the offer distribution within a coupon shipment. These particular parameters may vary depending on the coupon shipment size and also may vary depending on the geographic region from which the coupon shipment was sent. Therefore, the overall precision of the system and method for identifying coupon shipment abnormalities may be enhanced by structuring the system to account for at least the parametric variance associated with different coupon shipment sizes. An even more refined system and method might also account for the expected variance in coupon shipment parametrics associated with the different geographic regions in which the submitting retail stores are located.

FIG. 4 depicts allowable ranges determined by the system 40 (FIG. 3) for an illustrative statistical parameter of interest, namely the average coupon value in a coupon shipment, segregated by coupon shipment size. For example, based on the history of a number of previously submitted coupon shipments, the average value of a coupon in a coupon shipment containing 1 to 300 coupons should be in the range of from approximately 34 cents to 38 cents; and for a coupon shipment having 301 to 1000 coupons, the average coupon value should be in the range of from 32 cents to 37 cents. Similarly, for a coupon shipment having from 1001 to 3000 coupons, the average coupon value should be in the range of from approximately 33 cents to 38 cents; and for a coupon shipment having a total number of coupons in excess of 3000 coupons, the average coupon value should be in the range of from approximately 34 cents to 39 cents.

FIG. 5 depicts the allowable ranges determined by the system 40 for an additional illustrative statistical parameter of interest, namely the coupon value distribution within a coupon shipment, segregated by coupon shipment size. For example, based on the history of a number of previously submitted coupon shipments, the allowable range for the percentage of 30 cent coupons in a coupon shipment having from 1 to 300 coupons is from approximately 46 percent to approximately 53 percent of all of the coupons in the coupon shipment. Similarly, in the same coupon shipment, the allowable range of 50 cent coupons would be from approximately 7 to 13 percent of all of the coupons in the coupon shipment.

Figure 1:
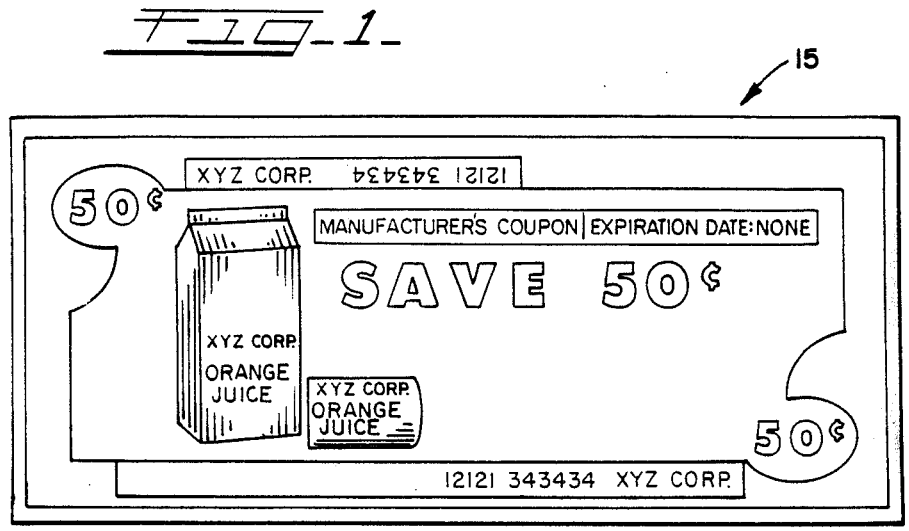
FIG. 1 depicts a typical manufacturer's discount coupon.

FIG. 6 depicts allowable ranges determined by the system 40 for an additional illustrative statistical parameter of interest, namely the average number of coupons per offer (promotion) in a coupon shipment, segregated by coupon shipment size. For example, in a shipment of coupons having from 301 to 1000 coupons, the allowable range determined by the system 40 for the average number of coupons per offer (for example, the offer identified by the code "343434" on the coupon 15 in FIG. 1) in such a coupon shipment is from approximately seven to ten coupons per offer.

An additional illustrative statistical parameter of interest is referred to in FIG. 7. Specifically, allowable ranges determined by the system 40 for the offer distribution as a percentage of a coupon shipment, segregated by shipment size, are set forth. This statistical parameter would be used in a highly refined system 40 to service a manufacturer that requires a considerably greater level of statistical analysis for the purpose of determining coupon misredemption. As depicted in FIG. 7 and as determined by the system 40 on the basis of previously submitted coupon shipments, the allowable ranges of offer distributions are set forth as a percentage of the total number of coupons in a coupon shipment. For example, for a coupon shipment of a single manufacturer having from 1001 to 3000 coupons, the allowable range for the percentage of coupons associated with the most numerous single offer in such a coupon shipment would be from approximately 43 to 52 percent of all of the coupons in the coupon shipment Similarly, the second most numerous offer would constitute approximately 25 to 32 percent of the coupons in the same coupon shipment. The offer distributions may be extended past the fourth most numerous offer to whatever level required by a manufacturer.

Figure 8:
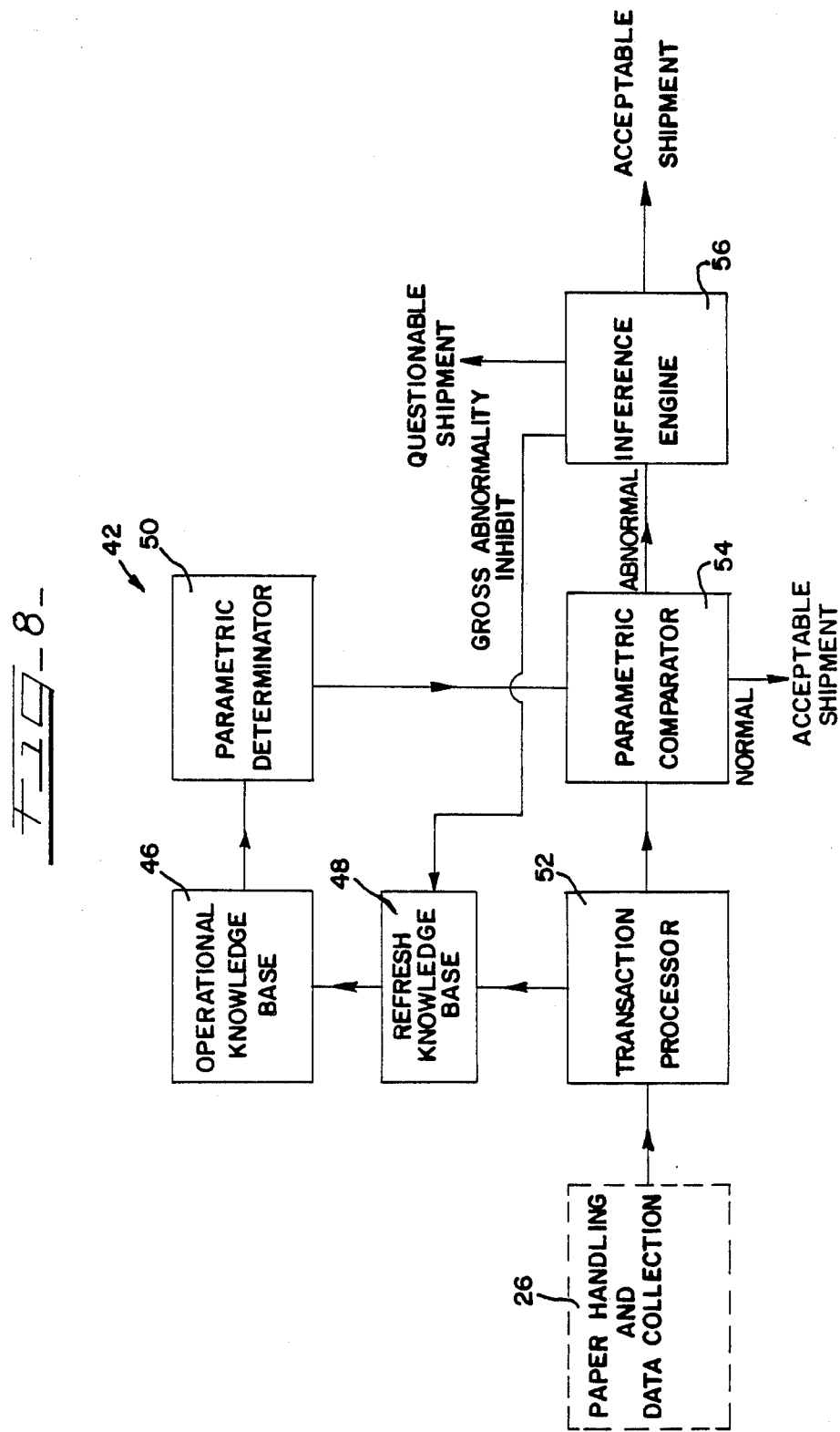
FIG. 8 is a block diagram showing the various subsystems or subroutines of the automated statistical analysis portion of the system and method of the present invention.

The particular components, subsystems or subroutines of the Automated Statistical Analysis Of Coupon Shipment Parameters stage 42 (FIG. 3) associated with a specific embodiment of the present invention are set forth in FIG. 8 and are generally physically embodied in or implemented by a computer, such as an IBM PC Model 5150 computer. Alternatively, for more involved statistical parameter analyses in accordance with the present invention, an IBM PC XT computer or an IBM PC AT Model 99 computer may be used. Specific instructions for performing the statistical parameter analysis as described hereinabove and hereinafter are programmed in a conventional manner.

As set forth in FIG. 8, information including data characteristics or statistical parameters of interest associated with a shipment of a single manufacturer's coupons from a retail store is provided to the Automated Statistical Analysis Of Coupon Shipment Parameters stage 42 from the Paper Handling And Data Collection stage 26 (FIG. 3). An operational knowledge base 46, preferably formed by a random access memory portion of a computer, contains data characteristics or statistical parameters of interest associated with a plurality of prior shipments of the same manufacturer's coupons from a plurality of retail stores. Since coupon shipment size and the geographic area of the submitting retail store are variable, the overall precision of the system 40 may be enhanced by structuring the operational knowledge base 46 to account for one or both of these variables. In the preferred embodiment of the present invention, the memory portion of the operational knowledge base 46 associated with each manufacturer requesting statistical analysis with coupon shipment size segregation is segregated into at least four distinct memory portions respectively associated with different coupon shipment sizes. For example, one memory portion stores the data characteristics or parametrics of specific coupon shipments having a total number of from 1 to 300 coupons; and another distinct memory portion stores the data characteristics associated with specific coupon shipments having from 301 to 1000 coupons. A further segregated memory portion stores the data characteristics of specific coupon shipments having from 1001 to 3000 coupons; and a fourth distinct memory portion stores the data characteristics of coupon shipments having more than 3000 coupons. In a considerably more refined system 40, the operational knowledge base 46 for a manufacturer could also be further segregated by geographic regions, for example, the Northeastern, Southeastern, Northwestern and Southwestern portions of the United States. Data characteristics associated with coupon shipments from different geographic regions could be identified and segregated in the operational knowledge base 46 by reference to the "ZIP" code or mailing code assigned by the United States Postal Service to the submitting retail store. Such a geographic segregation preferably (but not necessarily) would be in addition to the coupon size segregation, resulting in, for example, sixteen separate or distinct memory portions in the operational knowledge base 46 for coupon shipments associated with a single manufacturer. Obviously, finer groupings are possible both with respect to the coupon shipment size and with respect to geographic regions.

Preselected data characteristics of interest for a plurality of prior coupon shipments (in the preferred embodiment, five hundred prior coupon shipments) for each manufacturer serviced by the system 40 are retained within the operational knowledge base 46. Depending upon the number of coupon shipments concurrently stored in the operational knowledge base 46 and the volume of coupon shipments handled by the system 40 and the coupon shipment processing rate of the system 40, it is possible that the operational knowledge base 46 may contain preselected data characteristics of interest for one or more coupon shipments previously submitted by the same retail store that submitted a coupon shipment then being processed by the system 40. Regardless, a feature of the system 40 is that, in order to determine the presence or absence of parametric abnormalities in the coupon shipment then being processed, the system 40 utilizes preselected data characteristics stored in the operational knowledge base 46 and associated with coupon shipments from retail stores other than the retail store that submitted the coupon shipment then being processed by the system 40. In the preferred embodiment, the operational knowledge base 46 contains the average coupon value in cents, the average number of coupons per offer (promotion), and twenty different coupon value distributions for each shipment in the five hundred prior coupon shipments for each manufacturer. If requested, those characteristics would be segregated by coupon shipment size. Illustrative data characteristics for twenty-six of the five hundred prior coupon shipments for a single manufacturer are set forth in FIG. 9. For each shipment, the percentage of the shipment attributable to each of twenty different coupon values is retained in the operational knowledge base 46 as are the average coupon value in cents and the average number of coupons per offer. For example, in shipment number 1, thirteen percent of the coupons in that coupon shipment were ten cent coupons. Similarly, in the same shipment, seven percent of the coupons were twenty-five cent coupons. The average coupon value for the coupons in shipment number 1 was 17.80 cents; and the average number of coupons per offer in that shipment was 1.36 coupons. In assigning discount coupons to specific coupon values as set forth in FIG. 9, coupons whose values fall outside of the listed values preferably are assigned to the closest listed coupon value.

A more comprehensive system than that depicted in FIG. 9 could contain an additional ten or more offer distributions as referred to in FIG. 7, that is, the percentage of each coupon shipment associated with a predetermined number (for example, ten) of the most numerous coupon offers in that shipment. Similarly, less comprehensive systems may be restricted to one or more of the coupon value distributions depicted in FIG. 9 or, possibly, merely to the average coupon value for a particular shipment alone or in addition to the average number of coupons per offer for each shipment. As is apparent, a wide range of data characteristics or statistical parameters is available for use in characterizing normal coupon shipments at an analytical level desired by a manufacturer.

The stage 42 (FIG. 3) of the system 40 also preferably utilizes a refresh knowledge base 48 (FIG. 8) that is used to periodically update the operational knowledge base 46. The refresh knowledge base 48 may consist of a data register in the computer utilized in the system 40. Coupon promotions or offers are very volatile and larger manufacturers annually may run several thousand coupon offer campaigns. Therefore, it is highly desirable that the system 40 (FIG. 3) has learning capacity or the ability to account for short term, time variations of coupon shipment data characteristics. As the statistical analysis stage 42 reviews each coupon shipment parameter of interest to determine its normality, the data characteristics or parameters of interest of each coupon shipment are stored, unless inhibited due to gross abnormalities as described hereinafter, in the refresh knowledge base 48 for subsequent transfer to the operational knowledge base 46 on a first in, first out basis, thereby maintaining the information in the operational knowledge base 46 current on a time basis. While the refresh knowledge base 48 may be structured to contain the data characteristics of interest for only a single coupon shipment, in the preferred embodiment it accumulates the data characteristics of interest for fifty coupon shipments. Obviously, the refresh knowledge base 48 may be structured to contain the data characteristics of interest associated with a coupon shipment. When one or less than fifty depending upon the desired degree of statistical precision. When the data characteristics for fifty coupon shipments have been accumulated in the refresh knowledge base 48, the operational knowledge base 48 is updated by transferring all of those data characteristics from the refresh knowledge base 48 into the operational knowledge base 46 while simultaneously deleting the data characteristics associated with the oldest fifty coupon shipments contained in the operational knowledge base 46.

It is important that the integrity of the refresh knowledge base 48 be carefully maintained in order not to skew the information in the operational knowledge base 46. Thus, data characteristics associated with coupon shipments exhibiting gross abnormalities should be excluded from the refresh knowledge base 48 because their presence would ultimately result in inferior measurement capability and analytical results. Gross abnormality levels are determined by the degree of excursion from allowable ranges for data characteristics of interest associated with a coupon shipment When one or more data characteristics associated with a coupon shipment reaches or exceeds the predetermined gross abnormality levels, the statistical analysis stage 42 inhibits or prevents the retention of those data characteristics for that particular shipment in the refresh knowledge base 48, as discussed hereinafter.

The statistical analysis stage 42 also includes a parametric determinator 50 preferably in the form of a computational subroutine in which allowable ranges for the coupon shipment data characteristics of interest are automatically statistically derived from the data characteristics of the prior coupon shipments stored in the operational knowledge base 46. Basically, an average value and a statistically derived standard deviation for each data characteristic or parameter of interest are computed by the parametric determinator 50. A standard formula for determining standard deviation used by the system 40 is:

$$\sigma = \sqrt{\frac{\sum\limits_{i=1}^{N} x_i^2 - \left(\sum\limits_{i=1}^{N} x_i\right)^2}{N}}$$

in which:

"$\sigma$" is the standard deviation,

"N" is the number of shipments in the pertinent memory portion of the operational knowledge base 46, and "$x_i$" is the actual data characteristic or parameter of interest (for example, the average coupon value in a coupon shipment, or the average number of coupons per offer in a coupon shipment, or the coupon value distributions in a coupon shipment or, if selected, the offer distributions in a coupon shipment).

Each time the refresh knowledge base 48 accumulates the data characteristics of interest from fifty coupon shipments of a particular manufacturer, those data characteristics are transferred into the operational knowledge base 46 and the data characteristics associated with the oldest fifty coupon shipments for the same manufacturer are deleted from the operational knowledge base 46. Upon the completion of this operation, the parametric determinator 50 is activated to recompute the average values for the data characteristics of interest, the standard deviations for those data characteristics and the allowable ranges for the data characteristics. The newly computed allowable ranges are used by the system 40 to statistically analyze coupon shipments associated with the same manufacturer until the refresh knowledge base 48 accumulates data characteristics for another fifty coupon shipments, at which time the parametric determinator 50 updates the allowable ranges for the parameters of interest against which subsequent coupon shipments associated with the same manufacturer are compared.

FIG. 10 depicts illustrative partial outputs from the parametric determinator 50. The data characteristic or parameter of interest ($x_i$) is set forth as is the average value of that parameter and the standard deviation ($\sigma$) associated with that parameter. In addition, the allowable range for that parameter is set forth against which corresponding parameters in subsequent coupon shipments associated with the same manufacturer are compared. In the preferred embodiment, the allowable range for the average coupon value in a coupon shipment and for the average number of coupons per offer in a coupon shipment is determined by adding $\pm 2\sigma$ or standard deviations to the average value for each such parameter. In optimizing the sensitivity of the system 40 in the preferred embodiment, allowable ranges for the twenty value content distributions are established by adding the average value for each coupon value distribution to $\pm 3\sigma$ or standard deviations. Obviously, the parametric determinator 50 can be programmed to provide allowable ranges of any desired bandwidth, that is, smaller or greater than the average value $\pm 2\sigma$ or $\pm 3\sigma$ ranges referred to in FIG. 10.

The allowable ranges for the data characteristics of interest depicted in FIGS. 4 through 7 are determined in this manner by the parametric determinator 50. As is apparent in FIG. 10, only seven of the twenty coupon value distributions referred to in FIG. 9 are listed.

A transaction processor 52 (FIG. 8) is a specific subsystem or subroutine in which all of the data from the Paper Handling And Data Collection stage 26 associated with a particular coupon shipment is processed and in which the coupon shipment data characteristics or parameters of interest are calculated. For example, the total number of coupons and the total coupon value in a coupon shipment may be determined and the offer codes and the value of individual coupons within the coupon shipment may be accumulated. The transaction processor 52 computes the data characteristics or parameters of interest used by the system 40 in statistically analyzing coupon shipments, specifically, the average coupon value of the coupons in the coupon shipment and the average number of coupons per offer in the coupon shipment and the twenty coupon value distributions referred to in FIG. 9. These data parameters for each particular coupon shipment are then transferred by the transaction processor 52 to the refresh knowledge base 48 and to a parametric comparator 54 (FIG. 8).

The parametric comparator 54 is a subsystem or subroutine that compares the preselected data characteristics or parameters of interest of each coupon shipment received from the transaction processor 52 with the current allowable ranges for the parameters of interest as previously determined by the parametric determinator 50. If any parameter of interest is outside of the then current allowable range for that parameter, the operator of the system 40 is alerted, preferably by both an audible prompt and a visual prompt on a computer display terminal, to set that particular coupon shipment aside for special review and evaluation. If all of the data characteristics in a coupon shipment are normal or within the allowable ranges as determined by the parametric comparator 54, that shipment would be considered an acceptable or legitimate coupon shipment for which payment would be made to the submitting retailer. However, if any one or more of the parameters of interest are determined to be abnormal or outside of the allowable ranges for those parameters, all of the data characteristics or parameters of interest for that abnormal coupon shipment are transmitted to an inference engine 56.

The inference engine 56 is a characteristic part of an artificial intelligence system of the type embodied in the statistical analysis stage 42 of the system 40. Basically, the inference engine works in conjunction with either a low or high speed printer, for example an IBM Graphics Printer, to provide a hard copy output of the type depicted in FIG. 11 for each abnormal coupon shipment. The inference engine is a subroutine that analyzes all of the data characteristics of a suspicious coupon shipment and alerts the operator of the system 40 to the statistical abnormalities associated with that coupon shipment, enabling the operator to perform an abnormality audit review of the type referred to in FIG. 11.

Preferably, the inference engine 56 outputs through a compatible printer the submitting retail store's name and/or identification number, the discount coupon manufacturer's name and/or code number, the number of coupons and the coupon value for each offer code in the coupon shipment, and the total number of coupons and the total coupon value in the coupon shipment. Also, the inference engine 56 can be programmed to print out as a "First Alert" the first parametric abnormality determined by the parametric comparator 54. In addition, if desired, by determining and comparing the degree of excursion of the abnormal parameters associated with a coupon shipment, the inference engine 56 can determine and print out as a "Key Alert" the greatest parametric abnormality in the coupon shipment. A simple method for determining relative degrees of excursion from normal parameters includes computing the number of standard deviations ($\sigma$) by which the abnormal parameters exceed the average value for the parameters of interest.

As illustrated in FIG. 11, the output from the inference engine 56 alerts the operator of the system 40 (or auditor) to five parametric abnormalities, the "First Alert" being an abnormally high average coupon value in the coupon shipment of 56 cents and the "Key Alert" or greatest parametric abnormality being an abnormally high number of 75 cent coupons. Using this information, the operator of the system 40 can perform an intensive abnormality audit review with respect to the parametric abnormalities determined by the system 40, with respect to the history of the submitting retail store and with respect to the physical appearance of the coupons in the shipment.

In performing an abnormality audit review, the operator of the system 40 (or auditor) would review the number and extent of the parametric abnormalities determined by the system 40 and would use that information in forming a decision whether to pay the retail store for that coupon shipment or to deny payment or to refer the payment decision to the manufacturer. In addition, a further check of historical information concerning the submitting retail store would normally be performed, particularly if not previously performed at the Transaction Preparation and Review stage 24 (FIG. 3). The auditor should determine if the store actually exists, if the store has a previous history of coupon misredemption occurrences, if the coupon shipment is sufficiently suspicious even though not blatantly fraudulent that it should be referred to the manufacturer and whether or not the system 40 has previously identified the submitting retailer as having a history of coupon shipments with parametric abnormalities. In addition, the coupons should once again be closely inspected in order to determine whether there are clear physical abnormalities associated with the coupon shipment, all of which information can be used in making the payment decision.

Preferably, the inference engine 56 (FIG. 8) also determines whether the abnormal coupon shipment parameters are so grossly abnormal that all of the data parameters associated with that particular coupon shipment should be excluded from the refresh knowledge base 48. This inhibit determination is made by the inference engine 56 on the basis of the degree of excursion in standard deviations ($\sigma$) from the average value for the parameter found to be abnormal. In the preferred embodiment, an abnormal parameter of a coupon shipment that deviates from the average value for that parameter by more than $\pm 4\sigma$ or standard deviations results in the inhibiting of all of the data characteristics associated with that coupon shipment from retention in the refresh knowledge base 48. Obviously, a greater or lesser degree of excursion can be used by the inference engine 56 in making the inhibit decision based on the approach previously selected by the manufacturer being serviced by the system and method 40. Furthermore, if desired, each abnormal parameter that is capable of initiating such an inhibit can be printed out as a "Key Alert" (FIG. 11) for use in the abnormality audit review.

Figure 12:
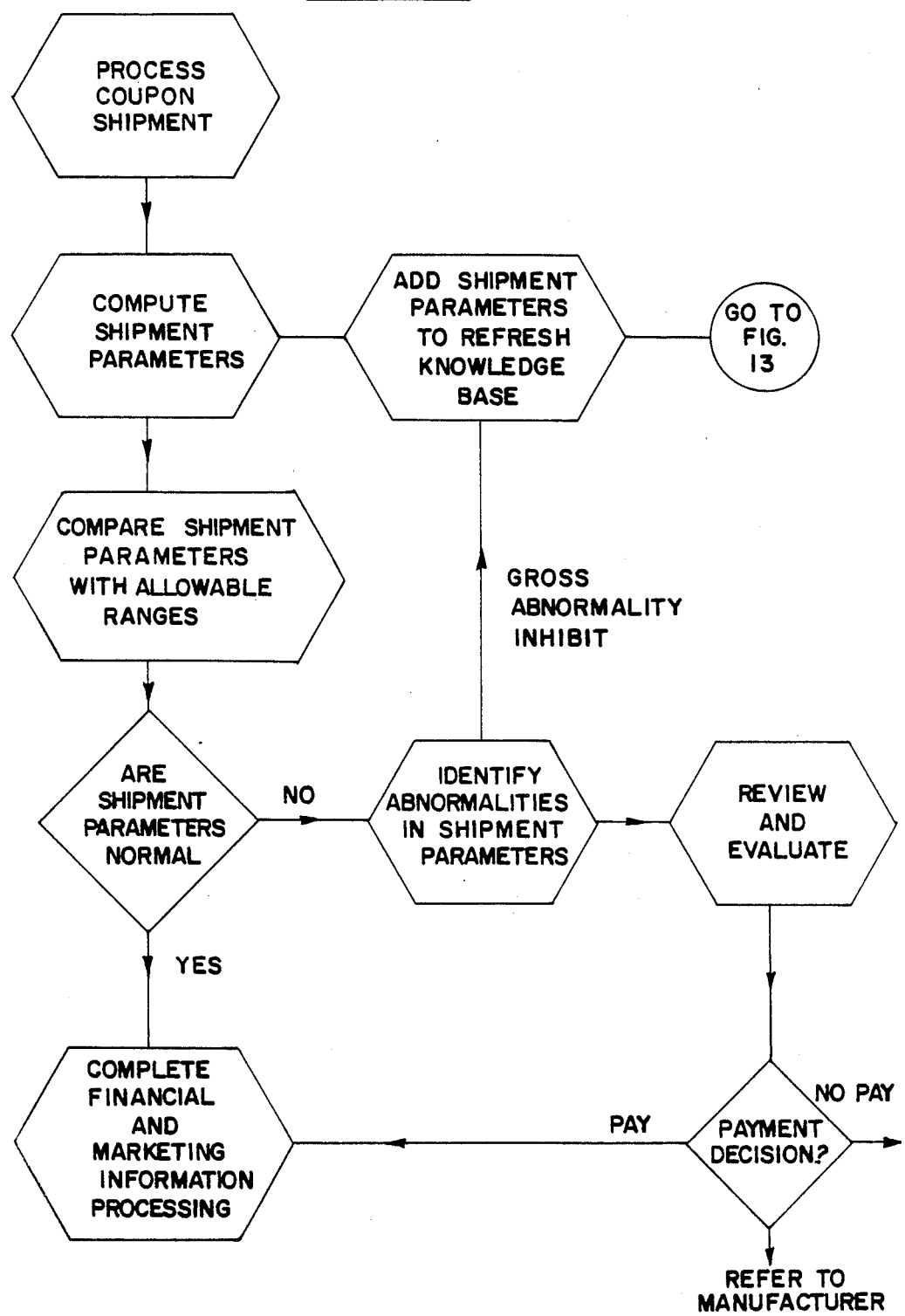
FIGS. 12 and 13 are logic flow diagrams of portions of the present invention.
Figure 13:
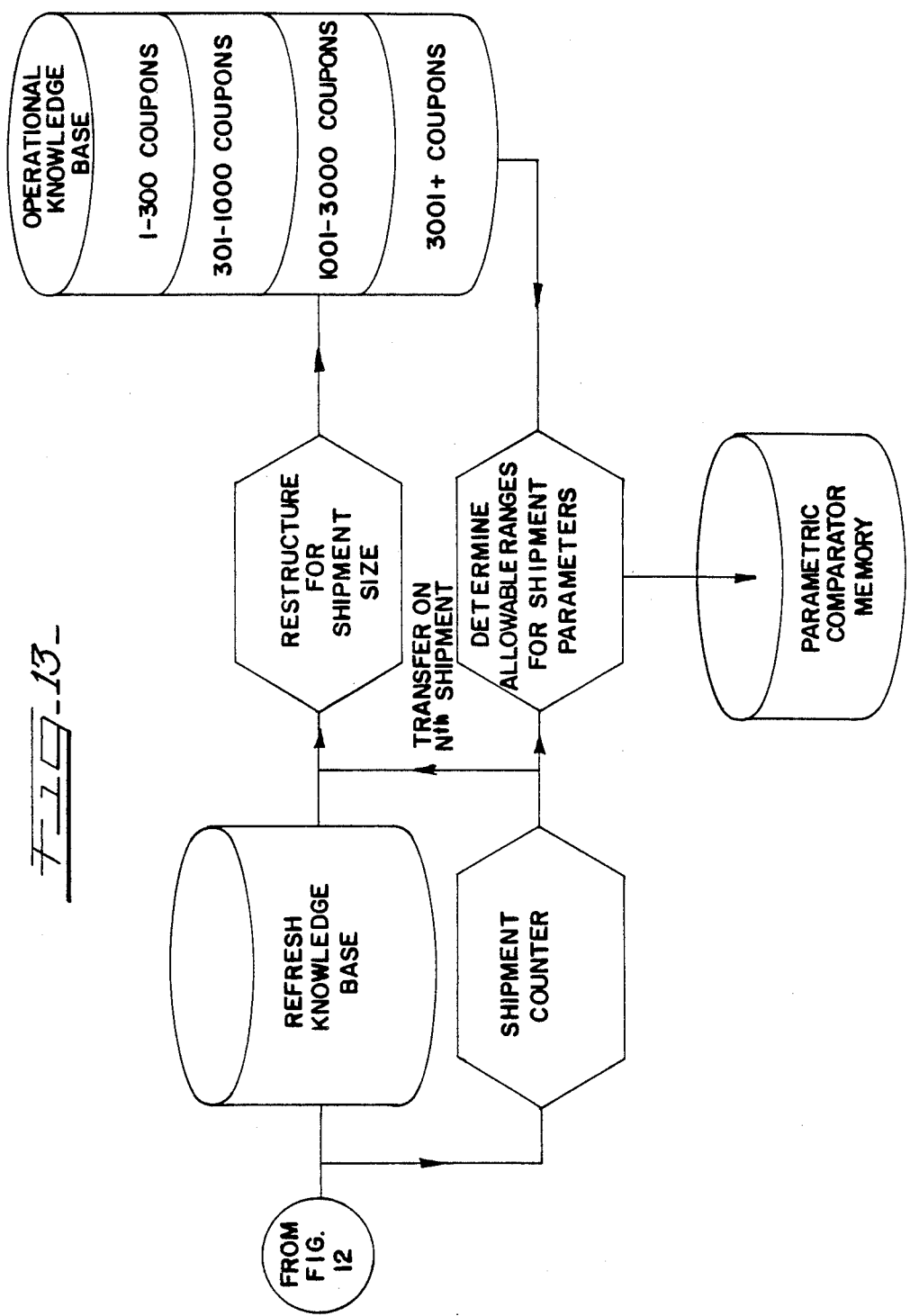

FIGS. 12 and 13 set forth logic flow diagrams for the coupon redemption system 40 and method. Basically, after the initial processing of each coupon shipment for a particular manufacturer through the stages 22, 24 and 26 of the system 40 (FIG. 3), the coupon shipment arrives at and is processed through the Automated Statistical Analysis Of Coupon Shipment Parameters stage 42 and, if necessary, the Review And Evaluation stage 44 (FIG. 3). Specifically, coupon shipment parameters of interest are calculated by the transaction processor 52 after which they are directed to the refresh knowledge base 48 and to the parametric comparator 54 for comparison with the allowable ranges for the parameters of interest previously determined by the parametric determinator 50. If the coupon shipment parameters are normal, that is, within the allowable ranges, the coupon shipment is passed on for processing through the Financial Services stage 28 and the Marketing Statistical Services stage 30 (FIG. 3). However, if parametric abnormalities are found in the coupon shipment (FIG. 12), they are specifically identified and quantified by the inference engine 56 for subsequent processing through the Review And Evaluation stage 44 (FIG. 3). If the inference engine 56 (FIG. 8) determines that one or more parametric abnormalities associated with the coupon shipment exceed gross abnormality levels (FIG. 12), the inference engine 56 inhibits the retention of all of the data characteristics associated with that coupon shipment in the refresh knowledge base 48 (FIG. 8). As a result of processing through the Review And Evaluation stage 44 (FIG. 3), a decision is made whether or not to pay the submitting retail store for that coupon shipment or to refer the payment decision to the manufacturer.

The system 40 is capable of "learning" or functioning as an artificial intelligence system because the information in the operational knowledge base 46 (FIG. 8) is kept current and updated by means of the data characteristics from newly processed coupon shipments accumulated in the refresh knowledge base 48. After the data characteristics from a preselected number of coupon shipments, for example fifty coupon shipments, are added to and retained in the refresh knowledge base 48 (FIG. 13), further processing of coupon shipments through the statistical analysis stage 42 of the system 40 is interrupted for a very short time (thirty seconds or less, depending on the computational speed of the computer used) in order to update the information in the operational knowledge base 46 as described hereinabove. After data characteristics for a plurality of newly processed coupon shipments have been transferred to the operational knowledge base 46, the parametric determinator 50 recalculates and updates the allowable ranges for coupon shipment parameters for use by the parametric comparator 54 in assessing the normality of the parameters of interest of new coupon shipments as determined by the transaction processor 52 (FIG. 8) Preferably, as depicted in FIG. 13, to increase the level of precision in the statistical analysis stage 42 of the system 40, the data characteristics for coupon shipments being entered into the operational knowledge base 46 are restructured or segregated in accordance with the size of each coupon shipment.

In this manner, a new and improved manufacturer's discount coupon redemption system is provided that is capable of rapidly and accurately identifying instances of coupon misredemption by statistically analyzing on an automated basis preselected coupon shipment data characteristics of interest in order to identify coupon shipment parametric abnormalities that may not be apparent from the physical appearance of the coupons. In addition to its learning capability, the present invention is inherently flexible. With relative ease, it may be adapted or customized to accommodate the requirements of different manufacturers for statistical analyses at different levels of analytical depth or complexity.

Obviously, many modifications and variations of the present invention are possible in light of the above teachings. Thus, it is to be understood that, within the scope of the appended claims, the invention may be practiced otherwise than as specifically described hereinabove.

What is claimed and desired to be secured by Letters Patent is:

1. A coupon redemption system comprising
means for processing coupon shipments,
said processing means including automated means for detecting parametric abnormalities associated with specific coupon shipments based on a plurality of coupon shipments previously processed by said system, said plurality of previously processed coupon shipments being from a plurality of retail stores,
said automated means comprising means for determining the value of at least one data characteristic associated with a specific coupon shipment and means for comparing said one data characteristic with a predetermined allowable range for said data characteristic.

2. A coupon redemption system as recited in claim 1 wherein said automated means further comprises means for determining said predetermined allowable range for said data characteristic.

3. A coupon redemption system as recited in claim 2 wherein said allowable range determining means comprises means for statistically deriving said allowable range from data characteristics associated with said plurality of previously processed coupon shipments.

4. A coupon redemption system as recited in claim 3 wherein said automated means further comprises means for periodically replacing at least a portion of said data characteristics with replacement data characteristics associated with coupon shipments processed by said system subsequently to said previously processed coupon shipments, said statistically deriving means being enabled upon said replacement of said data characteristics to recompute said allowable range for use by said comparing means.

5. A coupon redemption system as recited in claim 4 wherein said automated means further includes means for preventing the specific data characteristics associated with a specific coupon shipment from forming a part of said replacement data characteristics upon the determination that at least one of said specific data characteristics is outside of said allowable range by at least a predetermined amount.

6. A system for automatically identifying coupon shipment parametric abnormalities comprising
first means for determining a first data characteristic associated with a coupon shipment,
second automated means for comparing said first data characteristic with a predetermined first allowable range for said first data characteristic and for indicating a parametric abnormality associated with said coupon shipment when said first data characteristic is outside of said first allowable range and
third automated means for determining said first allowable range from a first group of data characteristics associated with a first group of coupon shipments previously processed by said system, said first group of coupon shipments being from a plurality of retail stores.

7. A system for automatically identifying coupon shipment parametric abnormalities as recited in claim 6 wherein said third automated means comprises means for determining the average value of the data characteristics in said first group of data characteristics and for statistically determining the standard deviation of the parameter associated with said first group of data characteristics, said first allowable range being established by said third automated means based at least in part on said average value and said standard deviation.

8. A system for automatically identifying coupon shipment parametric abnormalities as recited in claim 6 further comprising fourth means for storing said first group of data characteristics.

9. A system for automatically identifying coupon shipment parametric abnormalities as recited in claim 8 further comprising fifth means for replacing at least a portion of said first group of data characteristics with corresponding data characteristics associated with a plurality of coupon shipments processed by said system subsequently to said first group of coupon shipments.

10. A system for automatically identifying coupon shipment parametric abnormalities as recited in claim 9 wherein said third automated means is enabled upon the replacement of said data characteristics in said first group of data characteristics to recompute the values of said average value, said standard deviation and said first allowable range, the recomputed value of said first allowable range being subsequently used by said second automated means in place of the value for said first allowable range previously used by said second automated means.

11. A system for automatically identifying coupon shipment parametric abnormalities as recited in claim 8 wherein said fourth means comprises fourth means for storing said first group of data characteristics in a segregated manner based on coupon shipment size of each of said first group of coupon shipments.

12. A system for automatically identifying coupon shipment parametric abnormalities as recited in claim 8 wherein said fourth means comprises fourth means for storing said first group of data characteristics in a segregated manner based on a geographic characteristic associated with each coupon shipment in said first group of coupon shipments.

13. A system for automatically identifying coupon shipment parametric abnormalities as recited in claim 6 wherein said first data characteristic comprises the average coupon value of said coupon shipment.

14. A system for automatically identifying coupon shipment parametric abnormalities as recited in claim 6 wherein said first data characteristic comprises the average number of coupons per offer in said coupon shipment.

15. A system for automatically identifying coupon shipment parametric abnormalities as recited in claim 6 wherein said first data characteristic corresponds to the percentage of coupons in said coupon shipment associated with a specific coupon value.

16. A coupon redemption system comprising
means for determining data characteristics associated with a plurality of coupon shipments,
automated means for detecting parametric abnormalities associated with specific coupon shipments of said plurality of coupon shipments based on a comparison of at least one data characteristic associated with each of said specific coupon shipments with an allowable range for that data characteristic and
means for automatically statistically determining said allowable range in advance of said comparison based on corresponding data characteristics associated with a plurality of coupon shipments previously processed by said system, said plurality of previously processed coupon shipments being from a plurality of retail stores.

17. A coupon redemption system as recited in claim 16 wherein said data characteristic comprises the average coupon value of the coupons in each of said specific coupon shipments.

18. A coupon redemption system as recited in claim 16 wherein said data characteristic comprises the average number of coupons per offer in each of said specific coupon shipments.

19. A coupon redemption system as recited in claim 16 wherein said data characteristic comprises the percentage of the coupons in each of said specific coupon shipments associated with a specific coupon value.

20. A coupon redemption method comprising the steps of
preparing a plurality of coupon shipments for coupon redemption processing,
subjecting specific coupon shipments of said plurality of coupon shipments to automated processing to detect parametric abnormalities that may be associated with said specific coupon shipments,
said subjecting step including the steps of determining the value of at least one data characteristic associated with each specific coupon shipment, determining a predetermined allowable range for said data characteristic by statistically deriving said allowable range from data characteristics associated with a plurality of coupon shipments from a plurality of retail stores and previously processed in accordance with said method, and comparing said one data characteristic with said predetermined allowable range for said data characteristic.

21. A coupon redemption method as recited in claim 20 further comprising the steps of replacing at least a portion of said data characteristics with replacement data characteristics associated with coupon shipments processed in accordance with said method subsequently to said plurality of coupon shipments previously processed in accordance with said method and, subsequently, statistically recalculating said allowable range, based on the replacement of said data characteristics, for subsequent use in said comparing step.

22. A coupon redemption method as recited in claim 21 further comprising the step of automatically inhibiting the specific data characteristics associated with a specific coupon shipment from forming a part of said replacement data characteristics upon the determination that at least one of said specific data characteristics is outside of said allowable range by at least a predetermined amount.

23. A method for automatically identifying coupon shipment parametric abnormalities comprising the steps of
determining a first data characteristic associated with a coupon shipment,
determining on an automated basis a first allowable range from a first group of data characteristics associated with a first group of coupon shipments from a plurality of retail stores and previously processed in accordance with said method,
comparing on an automated basis said first data characteristic with said first allowable range and
providing an indication of a parametric abnormality associated with said coupon shipment when said first data characteristic is outside of said first allowable range.

24. A method for automatically identifying coupon shipment parametric abnormalities as recited in claim 23 wherein said step of determining said first allowable range comprises the steps of determining the average value of the data characteristic in said first group of data characteristics and statistically determining the standard deviation of the parameters associated with said first group of data characteristics and establishing said first allowable range based at least in part on said average value and said standard deviation.

25. A method for automatically identifying coupon shipment parametric abnormalities as recited in claim 24 further comprising the step of storing said first group of data characteristics in a portion the memory of a computer system.

26. A method for automatically identifying coupon shipment parametric abnormalities as recited in claim 25 wherein said first group of data characteristics are stored in said memory on a segregated basis based on the coupon shipment size of each coupon shipment in said first group of coupon shipments.

27. A method for automatically identifying coupon shipment parametric abnormalities as recited in claim 25 wherein said first group of data characteristics is stored in said memory on a segregated basis based on a geographic characteristic associated with each coupon shipment in said first group of coupon shipments.

28. A method for automatically identifying coupon shipment parametric abnormalities as recited in claim 25 further comprising the step of replacing at least a portion of said first group of data characteristics with corresponding data characteristics associated with a plurality of coupon shipments processed in accordance with said method subsequently to said first group of coupon shipments and, thereafter, redetermining the values of said average value and said standard deviation and reestablishing said first allowable range for subsequent use in said comparing step in place of the value of said first allowable range previously used in said comparing step.

29. A method for automatically identifying coupon shipment parametric abnormalities as recited in claim 23 wherein said first data characteristic comprises the average coupon value of the coupons in said coupon shipment.

30. A method for automatically identifying coupon shipment parametric abnormalities as recited in claim 23 wherein said first data characteristic comprises the average number of coupons per offer in said coupon shipment.

31. A method for automatically identifying coupon shipment parametric abnormalities as recited in claim 23 wherein said first data characteristic comprises the percentage of the number of coupons in said coupon shipment associated with a specific coupon value.

32. A method for automatically identifying coupon shipment parametric abnormalities as recited in claim 23 further comprising the step of periodically automatically updating said first allowable range based on the processing of coupon shipments in accordance with said method.

33. A coupon redemption system comprising
automated means for detecting parametric abnormalities associated with specific coupon shipment based on data characteristics associated with a plurality of coupon shipments, said plurality of coupon shipments being associated with a plurality of retail stores,
automated means for determining the value of at least one data characteristic associated with a specific coupon shipment,
said detecting means including automated means for comparing said one data characteristic with a predetermined allowable range for said data characteristic and
automated means for statistically deriving said allowable range from said data characteristics associated with said plurality of coupon shipments.

34. A system for automatically identifying coupon shipment parametric abnormalities comprising
first means for determining a first data characteristic associated with a coupon shipment,
second automated means for comparing said first data characteristic with a predetermined first allowable range for said first data characteristic and for indicating a parametric abnormality associated with said coupon shipment when said first data characteristic is outside of said first allowable range and
third automated means for determining said first allowable range from a first group of data characteristics associated with a first group of coupon shipments from a plurality of retail stores.

35. A system for automatically identifying coupon shipment parametric abnormalities as recited in claim 34 wherein said third automated means comprises means for determining the average value of the data characteristics in said first group of data characteristics and for statistically determining the standard deviation of the parameter associated with said first group of data characteristics, said first allowable range being established by said third automated means based at least in part on said average value and said standard deviation.

36. A system for automatically identifying coupon shipment parametric abnormalities as recited in claim 38 further comprising fourth means for storing said first group of data characteristics.

37. A system for automatically identifying coupon shipment parametric abnormalities as recited in claim 36 further comprising fifth means for replacing at least a portion of said first group of data characteristics with corresponding data characteristics associated with a second group of coupon shipments.

38. A system for automatically identifying coupon shipment parametric abnormalities as recited in claim 37 wherein said third automated means is enabled upon the replacement of said data characteristics in said first group of data characteristics to recompute the values of said average value, said standard deviation and said first allowable range, the recomputed value of said first allowable range being subsequently used by said second automated means in place of the value for said first allowable range previously used by said second automated means.

39. A system for automatically identifying coupon shipment parametric abnormalities as recited in claim 36 wherein said fourth means comprises fourth means for storing said first group of data characteristics in a segregated manner based on coupon shipment size of each of said first group of coupon shipments.

40. A system for automatically identifying coupon shipment parametric abnormalities as recited in claim 36 wherein said fourth means comprises fourth means for storing said first group of data characteristics in a segregated manner based on a geographic characteristic associated with each coupon shipment in said first group of coupon shipments.

41. A system for automatically identifying coupon shipment parametric abnormalities as recited in claim 34 wherein said first data characteristics comprises the average coupon value of said coupon shipment.

42. A system for automatically identifying coupon shipment parametric abnormalities as recited in claim 34 wherein said first data characteristic comprises the average number of coupons per offer in said coupon shipment.

43. A system for automatically identifying coupon shipment parametric abnormalities as recited in claim 34 wherein said first data characteristic corresponds to the percentage of coupons in said coupon shipment associated with a specific coupon value.

* * * * *